Figure 1:
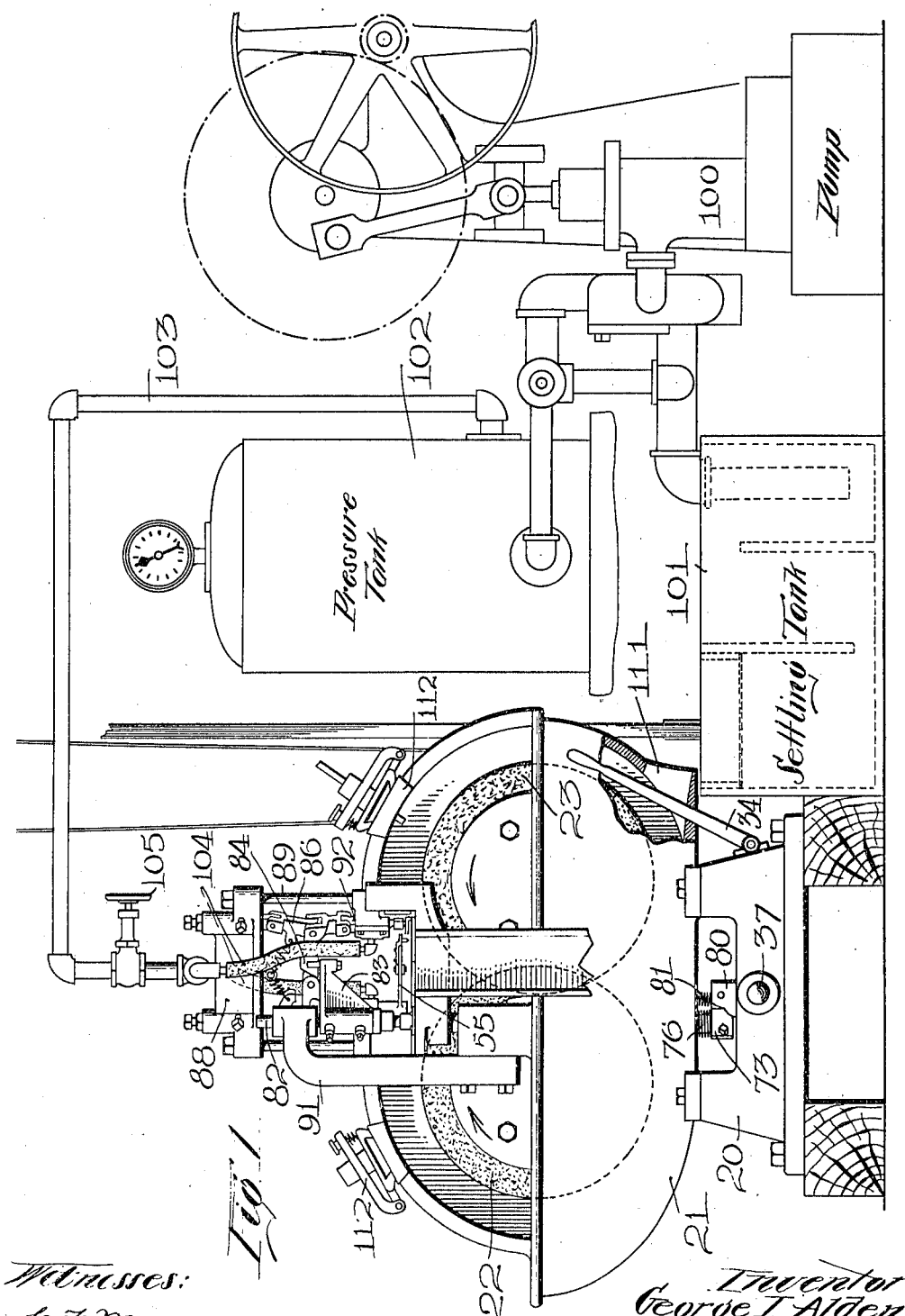

G. I. ALDEN.
GRINDING MACHINE.
APPLICATION FILED FEB. 11, 1910.

1,048,634.

Patented Dec. 31, 1912.
6 SHEETS—SHEET 2.

Witnesses:
G. F. Messer
E. M. Allen

Inventor
George I. Alden
by Attorneys
Southgate & Southgate

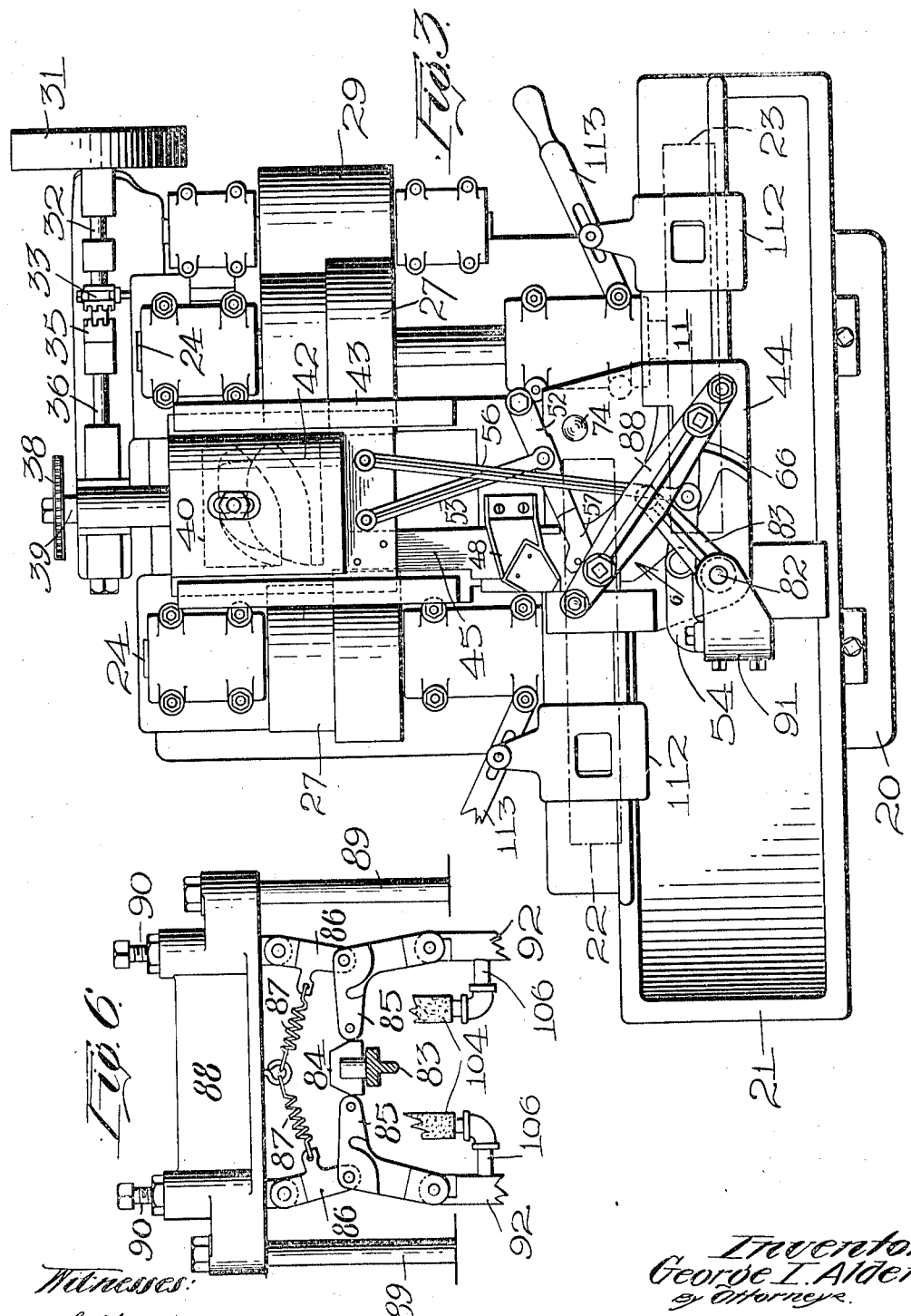

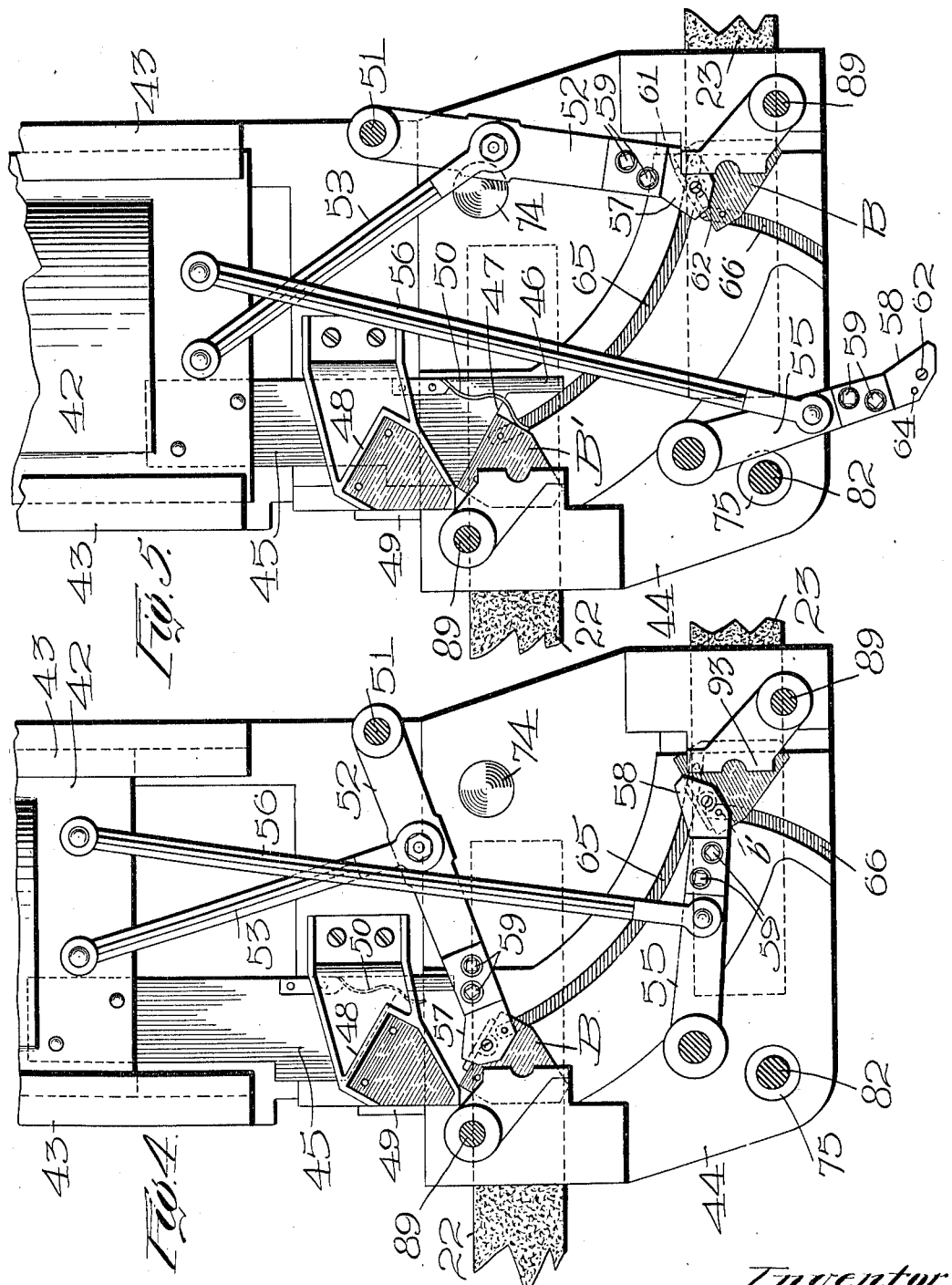

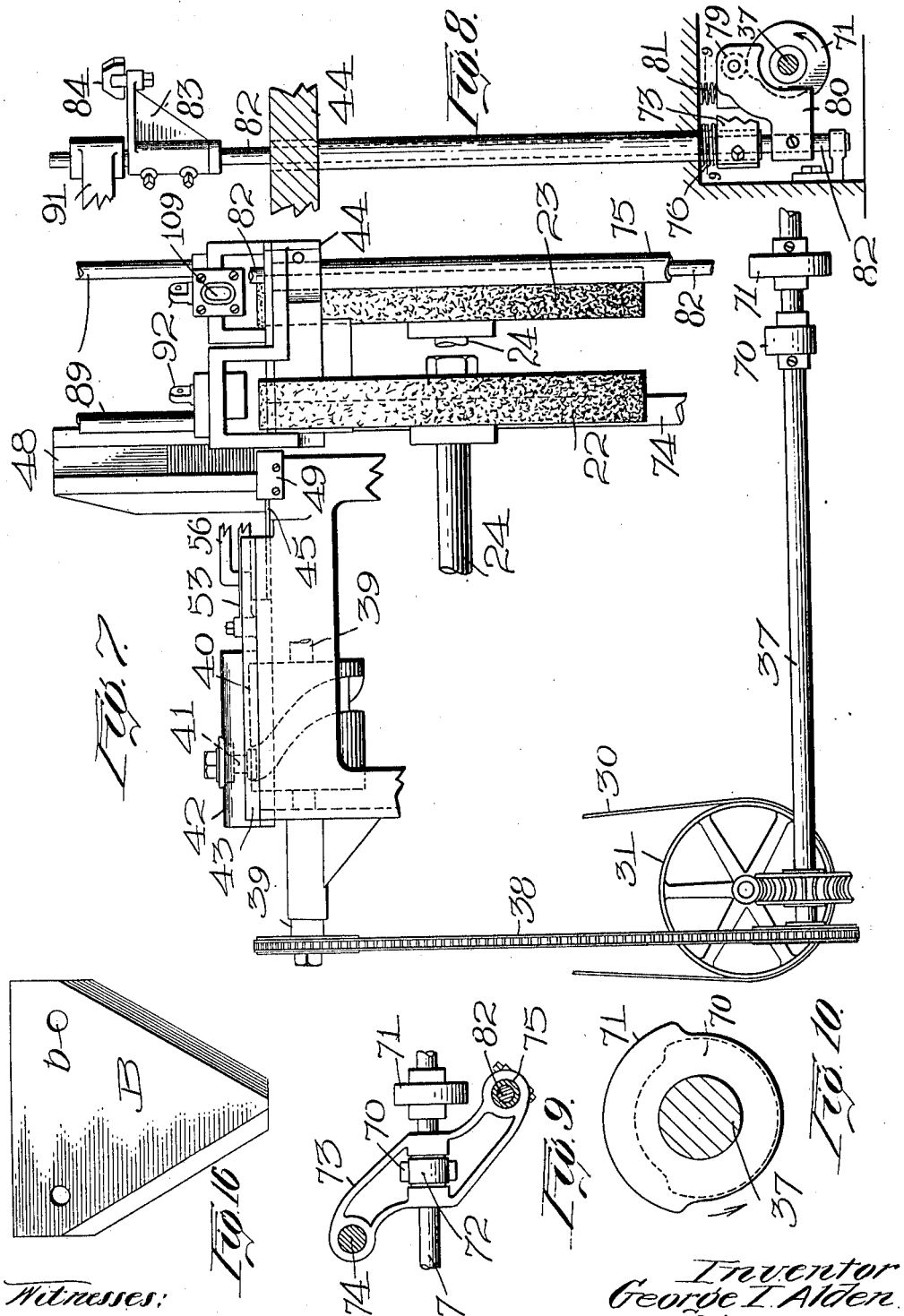

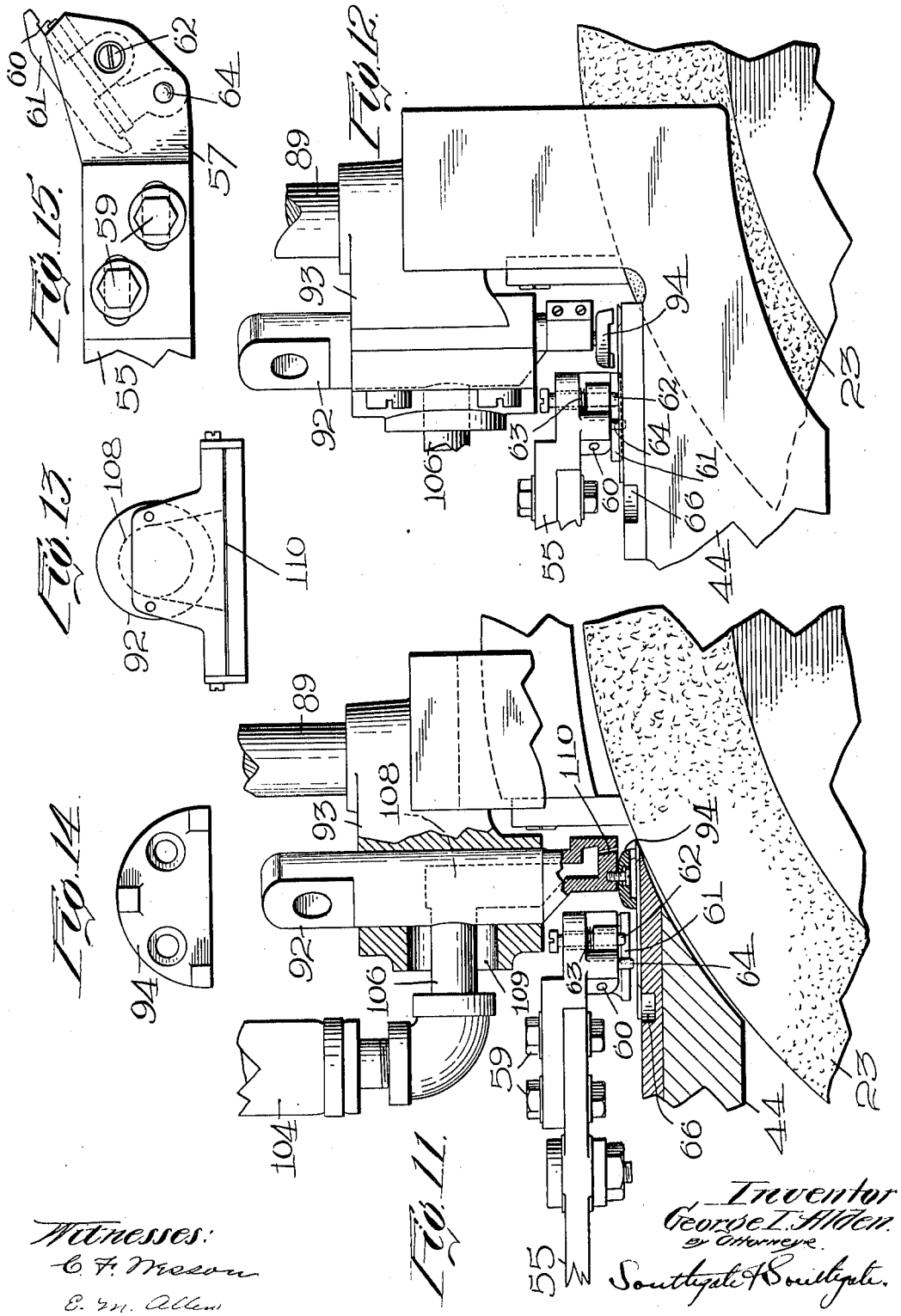

UNITED STATES PATENT OFFICE.

GEORGE I. ALDEN, OF WORCESTER, MASSACHUSETTS.

GRINDING-MACHINE.

1,048,634. Specification of Letters Patent. Patented Dec. 31, 1912.

Application filed February 11, 1910. Serial No. 543,297.

*To all whom it may concern:*

Be it known that I, GEORGE I. ALDEN, a citizen of the United States, residing at Worcester, in the county of Worcester and State of Massachusetts, have invented a new and useful Grinding-Machine, of which the following is a specification.

This invention relates particularly to a machine for automatically grinding the two cutting edges of the ordinary blades or knife sections used on mowing machines but obviously it is applicable to the grinding of other edged tools having one or more edges to be ground.
Most of the features of the invention relate more specifically to the grinding of blades having two edges at an angle to each other.

The principal objects of the invention are to provide means whereby the grinding of such thin blades by means of rapidly rotating stones or the like will be prevented from burning or drawing the temper of the edges thereof; to provide practicable and efficient means whereby said blades or knife sections can be fed automatically forward from a magazine holding a pile of them, and a holding means so situated as to hold the blades in proper contact with the rotating stone or the like for grinding one edge; to provide means whereby when the first edge is ground the blade will be automatically transferred in a simple and efficient manner to a second holding means adapted to hold the blade so that the other edge can be ground preferably by another stone; to provide means whereby the second blade will be thereafter transferred away from the stone and discharged from the machine;
to provide means whereby the above specified means will be operated automatically and in proper order so that while one blade is being fed from its first grinding position to the second, a succeeding blade will be fed into the first grinding position; and means whereby the two blades will be held in the two grinding positions and ground on opposite edges at the same time. Also to provide efficient means for clamping the blades in their grinding position at the proper time and for engaging them in such a way as to provide for removing them therefrom in the above described sequence; and to provide practicable and efficient means for operating the above mentioned devices preferably from a single source of power.

Further objects and advantages of the invention will appear hereinafter.

Reference is to be had to the accompanying drawings in which—

Figure 2:
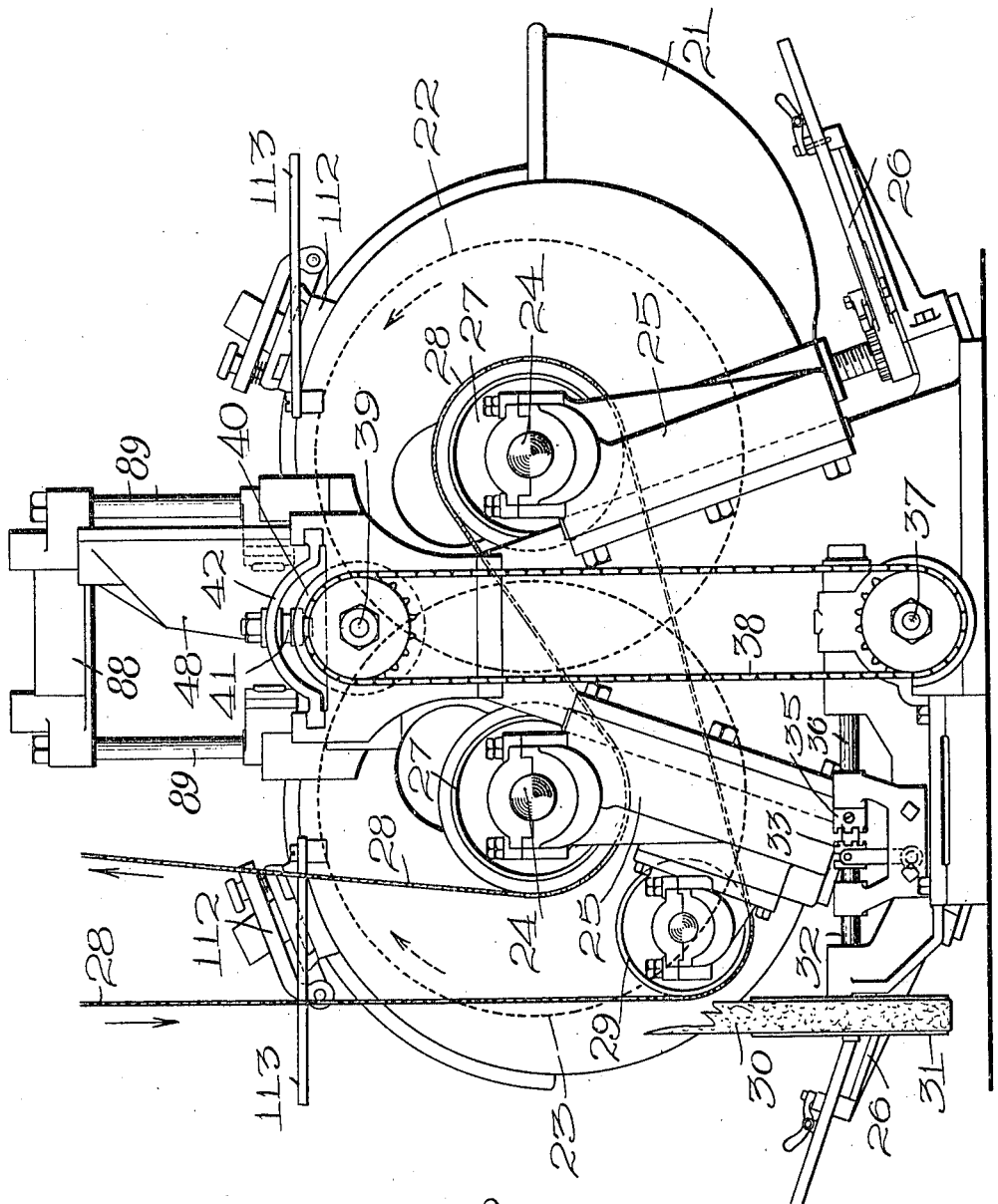

Figure 1 is a front elevation showing a preferred embodiment of the invention. Fig. 2 is a rear elevation of a portion of the same on enlarged scale showing the driving belts. Fig. 3 is a plan of the same. Figs. 4 and 5 are enlarged plan views of the knife section manipulating mechanism showing two different positions thereof. Fig. 6 is an elevation on enlarged scale looking in the direction of the arrow of Fig. 3. Fig. 7 is a fragmentary side elevation showing some of the driving mechanism and connected parts. Fig. 8 is an end view of the same with parts in section. Fig. 9 is a horizontal sectional view of the same of the line 9—9 of Fig. 8 showing parts in plan. Fig. 10 is a detail of the operating cams. Fig. 11 is a section view on the line 11—11 of Fig. 3 showing certain details of the mechanism for holding the blades in position. Fig. 12 is an elevation of the same showing the parts in another position. Fig. 13 is a bottom plan of the holding plunger. Fig. 14 is a bottom plan of the clamp foot. Fig. 15 is an enlarged plan of one of the blade holding heads, and Fig. 16 is a plan on enlarged scale of a mowing machine knife section which can be ground on this machine.

Referring first to Figs. 1 and 2 it will be seen that the invention is shown in a form in which a base 20 supports a tank 21 in which are mounted a pair of grinding wheels 22 and 23 located on parallel shafts 24 but out of alinement with each other as indicated in Fig. 3. These shafts are shown as adjustable as usual by means of sliding bracket bearings 25 and ratchet levers 26. They are provided with pulleys 27 over which passes a single continuous belt 28 which also passes under an idler pulley 29 so as to drive the two grinding wheels in opposite directions. The power for driving the rest of the mechanism comes from a belt 30, pulley 31 and shaft 32. This shaft is shown as provided with a clutch member 33 adapted to be operated by a lever 34 on the machine to bring it in and out of engagement with a clutch member 35 on a shaft 36. This shaft is shown as provided with a worm and worm wheel connected with a shaft 37 which, through a sprocket chain 38, drives a shaft 39. This shaft 39 as shown more specifically in Figs. 3 and 7, is provided with a cylindrical cam 40 fixed thereon into the groove of which projects an operating member 41 adjustably connected with a slide 42. This slide is caused obviously to move back and forth in horizontal ways 43, substantially on the level of a table plate 44 for supporting the work. Referring now more especially to Figs. 4 and 5 it will be seen that on this slide is a plunger 45 having a longitudinal projecting end 46 and a front wall 47 which makes an angle with the direction of motion of the plunger. Located over the path of this plunger is a magazine slanting wall on the plunger is a magazine 48 having such cross-section that it will receive the unsharpened blades or knife sections piled one upon another. This magazine has a passage therethrough at the bottom through which the flat plunger 45 is adapted to pass. It will be seen that the reciprocation of this plunger operates to force the bottom blade B out of the magazine along a wall 49 to the position indicated at the left of Figs. 4 and 5. It will be noticed that the blade B is directly over the grinding wheel 22 which projects slightly above the edge of the table plate. The way in which the blade is held in this position while it is being ground will be described hereinafter. As the blade is fed forward from its original position into the position B in Fig. 4, it will be noted that it does not follow exactly the motion of the plunger but is kept against the wall 49 by a spring 50 located on the plunger. Pivotally mounted on a stationary vertical stud 51 is an arm 52. This arm is operated by a link 53 connected with the slide 42. Also pivotally mounted on a stationary stud on a bracket 54 is a second arm 55 operated by a link 56 in a similar way. These arms are provided with heads 57 and 58 respectively. The head 58 is shown in Fig. 15 and the other head is of substantially the same construction but left-handed. It will be sufficient to describe the one shown in Fig. 15. In this case the head is adjustably mounted on the arm by means of bolts 59 extending through slots in the arm. On this head is a pivot 60 on which is swingingly mounted a finger 61 having a flat edge adapted to engage the rear surface of the blade. This finger is adapted to swing slightly on the pivot so as to permit a slight play of the blade. It is adjusted by a screw 62 and yieldingly held in position for engaging the blade by a spring 63. On the head also is a fixed pin 64 which operates to engage in one of the perforations b on the blade to transfer the latter as the arm moves. As the slide 42 moves from the position shown in Fig. 4 after a blade B has been ground on one side, to the position shown in Fig. 5, the pin 64 engaging in one of the perforations in the blade and the finger engaging the back, the arm 52 will swing through the arc of a circle designed as substantially equal to the angle between the two edges of the blade B until it comes into the position shown in Fig. 5. The pin meantime travels in a curved slot 65 in the table plate. This swings the blade around into proper position to be ground on the stone 23. It will be noticed that at the same time another blade B' has been brought into the position of the first blade as clearly shown in Fig. 5. Now as the slide 42 moves back the parts will come back to the position shown in Fig. 4 and the pin 64 of the arm 52 will enter the perforation in the blade B' (in a way to be described hereinafter) and the same will be positioned ready for grinding on the stone 22. On the next forward motion of the slide 42 while the blade B' is moved into its second grinding position the arm 55 will perform its function. It will be noted that with the parts in the position shown in Fig. 4 this arm 55 is in position for its pin 64 to engage in the other perforation b' in the blade which happens to be in its second grinding position, while its finger 61 is in position to engage the back edge of that blade. Now as the slide moves forward, the arm 55 swings forward to the position shown in Fig. 5 and carries the blade B with it, the pin moving in a curved slot 66 in the table plate. This shows the motions of the blade and it now remains to describe how the pins are engaged in the perforations b and how the blade is clamped so that it can be ground. On the shaft 37 as shown in Fig. 7 particularly, are two cams 70 and 71 called respectively the table cam and locking cam. On the table cam rests a roll 72 which is rotatably mounted on a stud fixed to a table lift arm 73; consequently, the table cam lifts this arm. On this arm is mounted a vertical rod 74 and a vertical hollow rod 75. These two rods support the table plate 44 and motion is imparted thereto to raise and drop it slightly once during each revolution of the shaft 37. This moves the blades toward and from the grinding wheels. A spring 76 is employed to assist the downward motion of the table and to yieldingly hold the blades against the wheels. The locking cam 71 operates a roll 79 mounted on a clamp lift arm 80 which is secured to a rod 82 which passes through the hollow rod 75. A spring 81 is shown for the same purpose as the spring 76. On this rod 82 is mounted a bracket 83 provided with an operating wedge 84 at the end thereof. This operating wedge is adapted to be moved upwardly by the motion of the rod 13

82 between the ends of a pair of toggle lever arms 85. These toggle levers are provided with links 86 and springs 87 for holding the same in a certain position. The links 86 are adjusted by screws 90. The links are pivoted to a head 88 fixed on the table plate by means of standards 89. The upper end of the rod 82 is guided in a stationary bracket 91. The bottoms of the toggle levers are connected with plungers 92 shown more in detail in Fig. 11, guided in supports 93 on the table plate. Each of these plungers is provided at the bottom with a clamp foot 94 having a three point contact with the blade which is supported by the table plate. This clamp foot is removably secured to the bottom of the plunger. The operation of this part of the device will now be understood. Briefly described, the operation is as follows:—Starting, for instance, from the position in which the table is up, and the blades have just been ground, the clamps are first released and the ground blades are moved forward by the motion of the slide and arms as heretofore described so that a new blade is brought into the position B', the blade in that position is moved into the position B, and the blade in the latter position is discharged from the machine. The clamps are then brought into operation and the table drops rapidly at first and then more gradually to bring the parts into the position shown in Fig. 5 in which the blades are in position for grinding on the stones. This also releases the blades from the pins of the arms 52 and 55. The blades are held by the clamps at this time. During the grinding operation the slide 42 moves back to the position shown in Fig. 4, taking the arms and plunger with it. The finger pieces 61, being yieldingly mounted, slide over the blades, which are held by the clamps, until the finger-pieces come to the back of the blades so that the two arms are in position with the pins over the perforation b. The table then rises to engage the pins in the blades and remove the blades from the stones. The initial rapid descent of the table is to save time during the grinding of the corners. When the stone reaches a point where the cut is wider the speed of the table is reduced. This also allows a better finish. This motion of course is governed by the shape of the cam 70. The roll 72 is on the low part of the cam 70 only during grinding and from the time the parts first reach the position shown in Fig. 5 until they reach that shown in Fig. 3, i. e., while the slide is moving back. The clamps are brought down by the cam 71 just before the table descends and they rise just after the table rises. Therefore the high part of the cam 71 is at the same side as the low part of the cam 70 but extends beyond it at both ends.

I have found that the ordinary application of water to thin cutter blanks of this description is not sufficient ordinarily to prevent them from being burned or the temper from being drawn when ground automatically by artificial wheels on two edges in quick succession without the attention of an operator. In order to overcome this difficulty I have provided means whereby the burning or temper drawing is effectively prevented in a very simple and convenient manner. For this purpose a pump 100 of any desired character is provided drawing water from any source, preferably from a settling tank 101, and supplying it to a pressure tank 102 under considerable pressure. I have found for example that a pressure of 100 to 150 pounds per square inch is very suitable for this purpose. From this tank the water is forced through a pipe 103 into a pair of distributing pipes 104 through a valve 105. From each of the pipes 104 it passes by means of connections 106 into a chamber 108 in each of the plungers 92. The supports for the plungers are provided with elongated passages 109 for receiving the connections 106 in all positions of the plungers. The bottom of each plunger is provided with a long narrow slot 110 by which the water issues in direct contact with the blanks or blades along a line a little back from the edge during the entire time during which the blank or blade is being ground. In fact the cooling water under this heavy pressure is discharged on the blade throughout the time while it is in position so that in addition to cooling the blade is keeps the other parts of the mechanism cool. I have found in practice that by providing a flow of water under high pressure the heat is carried off with such rapidity that even with thin blades of the particular temper required for mowing machines no appreciable burning or temper drawing takes place. The water is discharged over the blades on the surface of the stones and issues from an opening 111 in the casing 21. It then passes into the settling tank where it is strained and settled so that the particles removed from the stones are left in the bottom and the clear water is used over and over. This matter is not claimed herein, however, as it forms the subject matter of my co-pending application Serial No. 543,298, filed Feb. 11, 1910. The drawings also show an ordinary form of mechanism 112 for grinding off the stone accurately while in position, a lever 113 being employed for operating it. These parts are illustrated as of an ordinary well known construction and do not form part of the present invention.

The operation of the machine has been described in connection with the description of the mechanism shown in the drawings.

While I have illustrated and described a preferred embodiment of the invention and shown it as applied to the grinding of mowing machine knife sections or blades, I am aware that many modifications can be made therein and that it can be applied to the grinding of other edged implements and tools without departing from the scope of the invention as expressed in the claims. Therefore I do not wish to be limited to the exact form of the invention described nor to the exact use of the invention referred to but What I do claim is:—

1. In a grinding machine, the combination of a grinding wheel, a magazine constructed and adapted to hold articles to be ground in a pile therein, means for positively removing the articles edgewise one at a time transversely from the magazine, and means for holding them in position to be ground on the wheel.

2. In a grinding machine, the combination of a magazine for articles to be ground, a plunger passing below said magazine, means for reciprocating said plunger to push an article out of the magazine into position to be ground, and means for grinding said article.

3. In a grinding machine, the combination of a magazine for articles to be ground, a plunger passing below said magazine, means for reciprocating said plunger to push an article out of the magazine into position to be ground on one side, and means for thereafter transferring the article into position to be ground on the other side.

4. In a grinding machine, the combination of a magazine for articles to be ground, a plunger passing below said magazine, a shaft, means connected with said shaft for reciprocating said plunger to push an article out of the magazine into position to be ground on one side, and means operated by said shaft for thereafter transferring the article into position to be ground on the other side.

5. In a grinding machine, the combination of a magazine adapted to support a pile of flat articles therein, two grinding stones, means for moving an article edgewise from the magazine into position to be ground on one edge by one stone, and means for thereafter moving the article edgewise into position to be ground on the opposite edge by the other stone.

6. In a grinding machine the combination of a magazine for articles to be ground, a plurality of grinding stones on the same side of the magazine, means for moving the article from the magazine into position to be ground on one side by the nearest stone, means for thereafter moving the article into position to be ground on another stone, and means for thereafter removing the article from the machine.

7. In a grinding machine, the combination of a table plate, means for moving an article to be ground into grinding position thereon, means for grinding one edge of the article, means for then moving the article into a second grinding position on the table plate, and means for grinding another edge of the article at an angle to the first edge in its second position.

8. In a grinding machine, the combination of a table plate, means for moving an article to be ground into grinding position thereon, means for grinding the article, means for then moving the article along in the same general direction into a second grinding position on the table plate, means for grinding the article in its second position, and means for thereafter removing the first article from its second grinding position.

9. In a grinding machine, the combination of means for moving a flat article in a plane into grinding position, means for grinding the article, means for then moving the article in the same plane into a second grinding position, and means for grinding the article in its second position while another article is being ground in the first grinding position.

10. In a grinding machine, the combination of a stationary table plate, means for moving an article to be ground on the table plate, means for grinding the article while in position thereon, means for moving the article along the table plate into a second position, means for grinding a different edge of the article while in the second position, and means for thereafter removing the article from the table plate.

11. In a grinding machine, the combination of a table plate, two grinding stones out of alinement, but located parallel to each other below the plate at opposite edges thereof, means for rotating said grinding stones in opposite directions, means for feeding an article to be ground to a position on the table plate in which its edge projects into contact with one of the stones, and means for thereafter feeding said article to a position in which its opposite edge projects into engagement with the other stone.

12. In a grinding machine, the combination of a table plate, a pair of grinding stones under said plate, each projecting slightly above the plate at opposite edges thereof and out of alinement with each other, means for rotating said stones in opposite directions, and means for moving an article to be ground from position into engagement with one stone to a position in engagement with the other stone.

13. In a grinding machine, the combination of a table plate, a slide movable adjacent to said table plate, a plunger on the slide adapted to engage an article to be ground and move it into grinding position, an arm pivotally mounted with respect to said table plate, and means whereby when the slide moves forward, said arm will move said article along the table plate into a second position.

14. In a grinding machine, the combination of a magazine for articles to be ground a plunger movable through said magazine, said plunger having a longitudinal projection on one edge beyond the magazine, and a spring on said plunger near said projection for engaging an article moved by the plunger, and holding it in proper position, said plunger having a forward surface for engaging the article to be ground located at an angle to said projection.

15. In a grinding machine, the combination of a table plate, a slide movable adjacent thereto, arms mounted on the table plate for moving an article to be ground, means connected with the slide for operating said arms, a plunger fixedly mounted on the slide and moving the article to be ground in position to be engaged by said arms, said plunger having a longitudinal projection at one end thereof, and a spring on said plunger near said projection for engaging the article to be moved and holding it away from said projection.

16. In a grinding machine, the combination of a table plate, a slide movable adjacent thereto, means movable with said slide for advancing an article to be ground into grinding position, and means simultaneously movable with said slide for removing an article from said grinding position and advancing it to another position on the table plate when the slide moved forward.

17. In a grinding machine, the combination of a table plate, a slide movable adjacent thereto, a link pivotally connected with said slide, an arm pivoted on said table plate and connected with said link, means on said arm for engaging the edge of an article to be ground comprising a finger piece, and means for adjusting said finger piece along the arm.

18. In a grinding machine, the combination of a table plate, a slide movable adjacent thereto, two links pivotally connected with said slide, two arms each pivoted to said table plate, the point of pivotal connection of the table with one arm being at one side of the path of said slide, and that of the other arm being at the other side, each arm projecting inwardly from its point of pivotal connection with the table plate, each of said links being connected with one of the arms, whereby as the slide moves both of the arms will be swung on their pivots, the paths of movement of the ends of the arms intersecting each other, and means on each arm for engaging an article to be ground and moving it along with the arm as it swings.

19. In a grinding machine, the combination of a table plate, a slide movable adjacent thereto, means movable with said slide for advancing an article to be ground into grinding position, and means simultaneously movable with said slide for removing an article from said grinding position and advancing it to another position on the table plate when the slide moves forward, and means movable with said slide for advancing an article from said second position and discharging it from the machine when the slide moves forward.

20. In a grinding machine, the combination of a table plate, a slide movable adjacent thereto, a link pivotally connected with said slide, an arm pivoted on said table plate and connected with said link, and means on said arm for engaging the edge of an article to be ground.

21. In a grinding machine, the combination of a table plate, a slide movable adjacent thereto, a link pivotally connected with said slide, an arm pivoted on said table plate and connected with said link means on said arm for engaging the edge of an article to be ground, said means comprising a finger piece pivotally mounted on the arm to swing on a pivot parallel with the pivot about which the arm swings.

22. In a grinding machine, the combination of a table plate, a slide movable adjacent thereto, a link pivotally connected with said slide, an arm pivoted on said table plate and connected with said link, means on said arm for engaging the edge of an article to be ground, and means on the arm for positively engaging a definite portion of the article to be ground, whereby when the arm moves on its pivot said article will be dragged along the table plate with it.

23. In a grinding machine, the combination of a table plate, a slide movable adjacent thereto, a link pivotally connected with said slide, an arm pivoted on said table plate and connected with said link, means on said arm for engaging the edge of an article to be ground, and a pin projecting from said arm for engaging in a perforation in the article to be ground.

24. In a grinding machine, the combination of a table plate, a pair of grinding stones under said plate, each projecting slightly above the plate at opposite edges thereof and out of alinement with each other, means for rotating said stones in opposite directions, means for moving an article to be ground from position into engagement with one stone to a position in engagement with the other stone, said means comprising a pin adapted to pass through a perforation in the article, means for moving the pin, and a movable pin for engaging in a perforation in the article while in second position and transferring it from the table plate.

25. In a grinding machine, the combination of a table plate, a pair of grinding stones under said plate, out of alinement with each other, a pin adapted to pass through a perforation in the article, means for moving the pin, and a movable pin for engaging in a perforation in the article while in a second position and transferring it from the table plate, said table plate being provided with a groove extending from the first to the second position for receiving said first named pin as it transfers the article to be ground, and a second groove for receiving the second pin as it discharges the article from the table plate.

26. In a grinding machine, the combination of a table plate, a pin adapted to pass through a perforation in the article, means for moving the pin, and a movable pin for engaging in a perforation in the article while in a second position and transferring it from the table plate, and means for raising the table whereby the articles resting thereon will be brought up into such position that the pins will project into the perforations in the articles, and whereby when the table plate is lowered the articles will be freed from the pins.

27. In a grinding machine, the combination of a table plate, a slide movable adjacent thereto, a link pivotally connected with said slide, an arm pivoted on said table plate and connected with said link, means on said arm for engaging the edge of an article to be ground, means for raising said table plate to bring the article resting thereon into engagement with said means, and for lowering the table plate to disengage it therefrom after the article has been transferred to the second position.

28. In a grinding machine, the combination of a table plate, means for moving an article to be ground over the surface of the table plate into first grinding position, an arm located over the table plate, means for raising the table plate to bring the said article into engagement with said arm, and means for thereafter moving the arm to transfer the article to another position on the table plate.

29. In a grinding machine, the combination of a table plate, means for moving an article to be ground over the surface of the table plate into first grinding position, an arm located over the table plate, means for raising the table plate to bring the said article into engagement with said arm, means for thereafter moving the arm to transfer the article to another position on the table plate, means for then lowering the table plate to disengage it from the arm, and means for thereafter engaging the article and discharging it from the table plate.

30. In a grinding machine, the combination of a table plate, means for moving an article to be ground over the surface of the table plate into first grinding position, an arm located over the table plate, means for raising the table plate to bring the said article into engagement with said arm, means for thereafter moving the arm to transfer the article to another position on the table plate, means for lowering the table plate to release the article from said arm, means for moving the arm away, another arm, and means whereby when the table plate is again raised the article will be engaged by said other arm and transferred from the table plate.

31. In a grinding machine, the combination of a table plate, means for moving an article to be ground over the surface of the table plate into first grinding position, an arm located over the table plate, means for raising the table plate to bring the said article into engagement with said arm, means for thereafter moving the arm to transfer the article to another position on the table plate, and means for then clamping said article on the table plate.

32. In a grinding machine, the combination of a table plate, means for moving an article to be ground over the surface of the table plate into first grinding position, an arm located over the table plate, means for raising the table plate to bring the said article into engagement with said arm, means for thereafter moving the arm to transfer the article to another position on the table plate, means for then clamping said article on the table plate, means whereby after the article is ground the clamping means will be released, means for moving the arm to transfer the article from second position, and means whereby the article will be clamped in said second position.

33. In a grinding machine, the combination of a shaft, a table cam and a locking cam thereon, a table plate, means operated by said table cam for raising and lowering the table plate, a clamping device over the table plate, and means operated by the locking cam for operating said clamping device after the table plate has been raised.

34. In a grinding machine, the combination of a table cam and a locking cam, a table plate, means operated by said table cam for raising and lowering the table plate, a clamping device, and means operated by the locking cam for operating said clamping device, and for releasing the clamping device while the table is raised.

35. In a grinding machine, the combination of a shaft, a cam thereon, a table lift arm having a roller resting on said cam, said arm projecting from the roller in opposite directions, two rods projecting upwardly from said table lift arm, and a table plate supported by said rods.

36. In a grinding machine, the combination of a shaft, a cam thereon, a table lift arm having a roller resting on said cam, said arm projecting from the roller in opposite directions, two rods projecting upwardly from said table lift arm, a table plate supported by said rods, one of said rods being hollow, a third rod passing through said hollow rod, means for operating the third rod, and means connected therewith for clamping articles on the table plate.

37. In a grinding machine, the combination of a shaft, a cam thereon, a table lift arm having a roller resting on said cam, said arm projecting from the roller in opposite directions, two rods projecting upwardly from said table lift arm, a table plate supported by said rods, another cam on said shaft, a clamp over the table, and means operated by the second cam for moving said clamp into and out of operative position.

38. In a grinding machine, the combination of a shaft, a cam thereon, a table lift arm having a roller resting on said cam, said arm projecting from the roller in opposite directions, two rods projecting upwardly from said table lift arm, a table plate supported by said rods, another cam on said shaft, a clamp over the table, means operated by the second cam for moving said clamp into and out of operative position, resilient means for assisting the table plate to move downwardly, and resilient means for moving the clamp out of operative position.

39. In a grinding machine, the combination of a supporting table for the work, means for clamping the work thereon, a grinding member located adjacent to said table, and means for moving the table transversely toward the grinding member when the work is clamped upon it.

40. In a grinding machine, the combination of a supporting table for the work, a grinding member located under it, means for moving the table downwardly toward the grinding member, with an initially rapid motion and a slower motion at the end of the stroke and means for holding the work clamped on the table while being moved down.

41. In a grinding machine, the combination of a supporting table for the work, a shaft, means connected with said shaft for moving the work into position on the table, means for clamping the work on the table, and means operated by said shaft for lowering the table to bring the work into position for grinding.

42. In a grinding machine, the combination of a supporting table for the work, means for moving the work into position on the table, means for clamping the work on the table, and means for lowering the table to bring the work into position for grinding with an initially rapid motion and a slower motion at the end of the stroke.

43. In a grinding machine, the combination of a supporting table for the work, means for moving the work into position on the table, means for clamping the work on the table, means for lowering the table to bring the work into position for grinding and for thereafter raising the table, and means for then removing the work from grinding position.

44. In a grinding machine, the combination of a table plate for supporting the articles to be ground, means for moving the articles along said plate from one grinding position to another, means for simultaneously clamping the articles in both grinding positions, said last named means comprising a pair of plungers, each having a clamp-foot thereon, a movable member, and a pair of sets of levers adapted to be engaged simultaneously by the movable member for operating the plungers.

45. In a grinding machine, the combination of a table plate for supporting the articles to be ground, means for moving said articles from one grinding position to another grinding position on said table plate, a pair of plungers, one located over each of said grinding positions, two sets of toggle levers, one connected with each plunger, and a reciprocable wedge-shaped member adapted to engage said toggle levers and simultaneously operate them to depress the plungers.

46. In a grinding machine, the combination of a table plate for supporting the work to be ground, means for moving the said table plate vertically, a stationary support adjacent to the table plate, a plunger mounted to move vertically on said support, and to engage the top of the table plate to hold the work thereon, a toggle lever connected with said support and with the plunger, and a movable member adapted to operate the toggle lever to depress the plunger while the table is raised.

47. In a grinding machine, the combination of means for supporting the articles to be ground, a clamping plunger for clamping the articles on said means, said plunger having a clamping foot removably mounted thereon at the bottom and having a plane surface provided with a plurality of points projecting therefrom for engaging the work.

48. In a grinding machine, the combination of a table plate for supporting the articles to be ground, means for moving the articles along said plate from one grinding position to another, and means for simultaneously clamping the articles in both grinding positions.

49. In a grinding machine, the combination of a table plate, two grinding stones out of alinement, but located parallel to each other, means for feeding an article to be ground to a position on the table plate in which its edge projects into contact with one of the stones, and means for thereafter feeding said article to a position in which its opposite edge projects into engagement with the other stone.

50. In a grinding machine, the combination of a table plate, two grinding stones located below the plate at opposite edges thereof, means for feeding an article to be ground to a position on the table plate in which its edge projects into contact with one of the stones, and means for thereafter feeding said article to a position in which its opposite edge projects into engagement with the other stone.

In testimony whereof I have hereunto set my hand, in the presence of two subscribing witnesses.

GEORGE I. ALDEN.

Witnesses:
C. O. SMITH,
A. J. DUPRÉ.